Oct. 26, 1965  H. J. TYLER  3,214,538
THERMOSTATIC CONTROL DEVICE HAVING
IMPROVED CALIBRATION MEANS
Original Filed Dec. 28, 1959
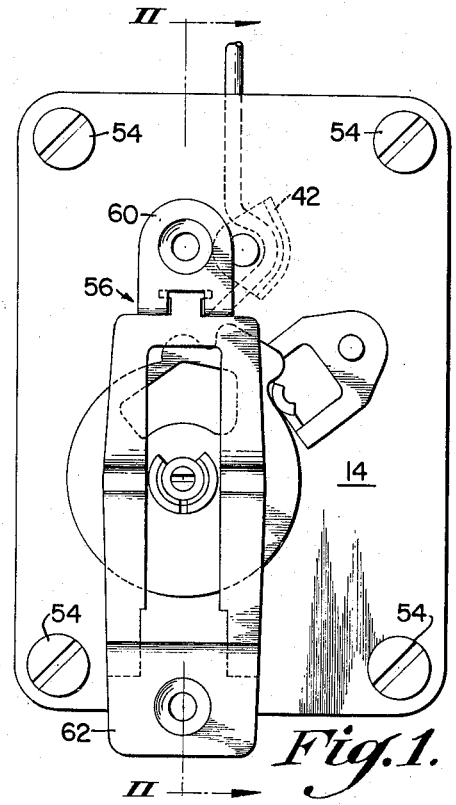
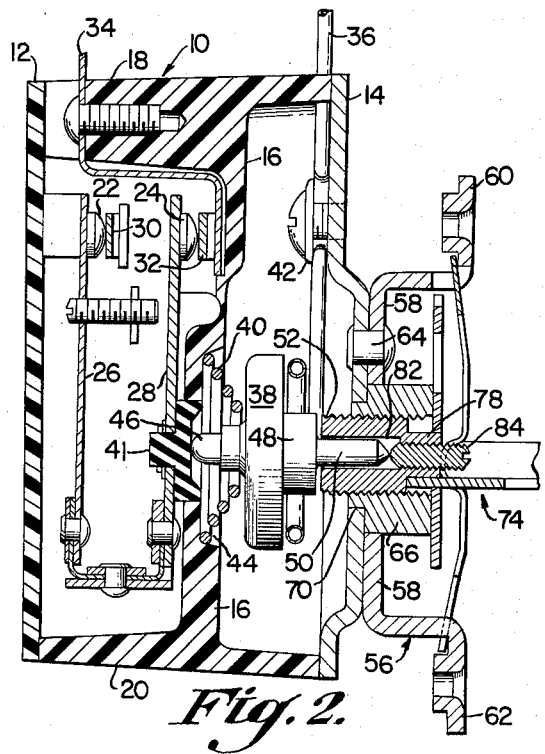
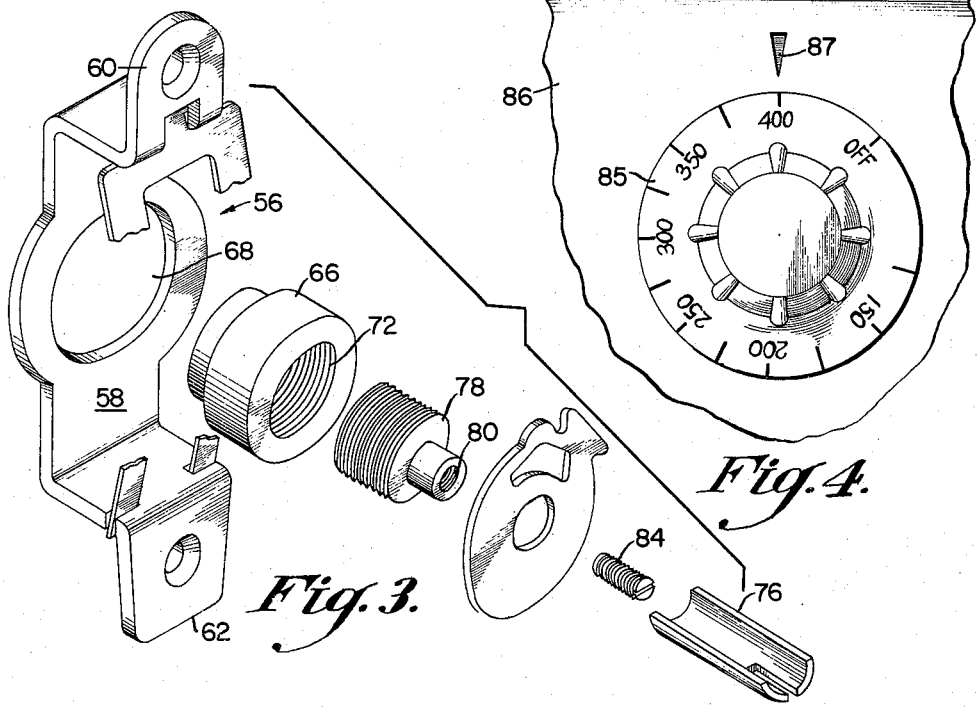

United States Patent Office 3,214,538
Patented Oct. 26, 1965

3,214,538
THERMOSTATIC CONTROL DEVICE HAVING IMPROVED CALIBRATION MEANS
Hugh J. Tyler, Jeannette, Pa., assignor to Robertshaw Controls Company, a corporation of Delaware
Continuation of application Ser. No. 862,107, Dec. 28, 1959. This application Dec. 2, 1964, Ser. No. 416,962
3 Claims. (Cl. 200—139)

This application is a continuation application of the copending application, Serial Number 862,107, filed December 28, 1959, now abandoned.

This invention relates to thermostatic control devices and more particularly to a thermostatically controlled regulator having calibration means.

An object of the invention is to construct a control device having a calibrating means adapted to rotate with and related to the temperature adjusting means.

Another object of the invention is to accomplish the calibration by the use of a minimum number of simple parts resulting in a device having reduced cost of manufacture, installation, and replacement.

Another object of the invention is to construct a universal thermostatically controlled regulator capable of various type installations with a minimum of structural change.

Other objects and advantages will become apparent from the following description taken in connection with the accompanying drawings wherein:

FIG. 1 is a front elevation of a thermostat control device embodying the calibration means of this invention;

FIG. 2 is a section taken along the line II—II of FIG. 1;

FIG. 3 is an exploded isometric view, partly in section, of a detail of the invention; and FIG. 4 is a fragmentary view of a stove panel showing the temperature adjusting dial and corresponding reference mark.

Referring now to the drawings, FIGS. 1-3 show a preferred embodiment of the invention wherein a thermostatically controlled regulator is provided with a housing 10 having a back portion 12 and a cover assembly 14. A centrally positioned partition 16 extends inwardly from the sidewalls 18, 20 of housing 10 and is supported thereby.

A pair of contacts 22, 24, mounted on the movable contact arms 26, 28, are disposed within the housing 10 and are positioned to engage a pair of fixed contacts 30, 32. The fixed contacts 30, 32 are disposed on terminal connections 34 for a line wire (not shown) which completes a circuit to a heater means (not shown) to be controlled by the thermostatic regulator.

A temperature responsive means, including a capillary tube 36 and a diaphragm element 38, are resiliently mounted within the housing 10 between the partition 16 and the cover assembly 14 by means of a helical spring member 40 and a capillary tube clamp 42. One end of the helical spring member 40 is disposed within a recess 44 in the partition 16 and the other end is in resilient engagement with the diaphragm element 38.

The diaphragm element 38 is provided with a button 46 on one side thereof extending inwardly into the convolutions of the spring member 40 into operative engagement with an insulator 41 carried on the contact arm 28. An outwardly extending head portion 48 is carried on the other side of the diaphragm element 38. A portion of the head 48 is formed with a reduced diameter and provides an actuating pin 50 and a shoulder portion 52.

The cover assembly 14 is mounted on the housing 10 by any suitable means as, for example, by mounting screws 54 and is provided with a bracket 56 having a recessed portion 58 and a pair of outwardly extending ends forming ears 60, 62. A rivet 64 secures the bracket 56 to the cover assembly 14. A bushing 66 extends through an opening 68 in the bracket 56 and a coaxial opening 70 in the cover assembly 14 and is fastened to cover 14 by any suitable means, such as welding. The bushing 66 is provided with a threaded bore 72 communicating with the interior of the housing 10.

A temperature adjusting shaft 74, comprising a stem portion 76 and a threaded body portion 78, is mounted in the bore 72 of the bushing 66. The body portion 78 is provided with an internally threaded area 80 of reduced diameter adjacent one end thereof and a smooth counterbore 82 extending through the externally threaded portion adjacent the opposite end thereof.

A calibrating screw 84 is operatively positioned within the internally threaded portion 80 of the body portion 78 of the temperature adjusting screw 74 in engagement with the free end of the actuating pin 50 on the head 48 of the diaphragm element 38. The actuating pin 50 extends into the counterbore 82 of the body portion 78 of the temperature adjusting shaft 74 and is longitudinally movable therein by rotation of the calibration screw 84 relative to the temperature adjusting shaft 74. It will be obvious that longitudinal movement and adjustment of the actuating pin 50 may be accomplished by either rotating the calibration screw 84, while holding the temperature adjusting shaft 74 stationary, thereby changing the relative position of pin 50 with respect to threaded body portion 78, or by holding the calibration screw 84 stationary and rotating the temperature adjusting shaft 74 to change the relative position therebetween.

Assume now that the temperature adjusting shaft 74 and its related knob and dial 85 mounted on a control panel 86 adjacent a reference mark 87 are in such a position that the desired indicated temperature fails to correspond to the actual controlled temperature, and, therefore, adjustment and calibration of the temperature adjusting shaft 74 with respect to the diaphragm element 38 is necessary. Correction of the error existing between the desired indicated temperature and the actual controlled temperature may be accomplished quickly and easily by holding the temperature adjusting shaft 74 stationary and imparting rotation to the calibration adjusting screw 84 with a screwdriver or any other suitable tool.

The calibrating operation is effected by manually adjusting the relationship between the actuating pin 50 and the threaded body portion 78. Clockwise rotation of the calibrating screw 84 while holding temperature adjusting shaft 74 stationary will lower the controlled temperature and counterclockwise rotation of the calibration screw 84 will raise the controlled temperature. As noted hereinbefore, the same end may be accomplished by holding the calibration screw 84 in a fixed position and rotating the temperature adjusting shaft 74 to change the relationship therebetween. It will be noted that in following the second procedure, the rotation of the parts relative to each other must be reversed so that the controlled temperature will be lowered by holding the calibration screw 84 and rotating the temperature adjusting shaft in a counterclockwise direction. The controlled temperature will be raised by holding the calibration screw and rotating the temperature adjusting shaft in a clockwise direction. Undesired rotation of the calibration screw 84 with respect to the temperature adjusting shaft 74 is prevented by the use of any suitable thread locking material.

Furthermore, since the temperature adjusting shaft 74 is constructed of a body portion 78 and a stem portion 76 which are joined by any suitable means, such as brazing or soldering, it is possible to utilize this control with various type installations for stem portions 76 of various lengths may be attached to the body portion to allow mounting the device in many positions.

The type of control shaft construction and the arrangement of the calibration adjustment means as described above offer numerous advantages: the complete calibration adjustment means comprises a minimum of parts; the calibrating screw 84 is in direct contact with the actuating pin 50 for the diaphragm element 38 and, therefore, positive adjustment is assured; adjustment may be readily and easily accomplished with the use of only a screwdriver without the removal of any parts except the dial knob. Because of the arrangement of parts wherein the actuating pin 50 is in direct contact with the calibrating screw 84 and the calibrating screw 84 rotates with the temperature adjusting shaft, the calibrating parts are fixed in the adjusted position and accidental or undesired change in their relative positions is rendered unlikely.

While only one embodiment of the present invention has been shown and described herein, it will be apparent that various changes may be made in the form and arrangement of parts without departing from the scope of the invention as defined in the appended claims.

While the form of the invention now preferred has been disclosed as required by the statutes, other forms may be used, all coming within the scope of the claims which follow.

What is claimed is:

1. In a thermostatic control device, the combination of a casing having a portion providing a threaded bore in one wall thereof, an adjusting member having an external threaded portion cooperable with said bore, said member having an axial bore one portion of which is threaded, said adjusting member having a shaft attaching means, temperature responsive means including a stem mounted for reciprocation in said housing, a calibration screw movable in said one portion of said axial bore and operably engageable with said stem, and temperature adjusting means including a shaft member secured to said shaft attaching means of said adjusting member, said shaft member being of a preselected length and thereby being adapted to support a temperature selecting handle in a predetermined position spaced from said casing wall, said shaft member having a C-shaped cross-sectional configuration to permit access to said calibration screw.

2. In a thermostatic control device, the combination of a casing having a portion providing a threaded bore in one wall thereof and having another wall spaced from said one wall, and adjusting member having an external threaded portion cooperable with said bore, said member having an axial bore one portion of which is threaded, temperature responsive means disposed between said walls and including a stem mounted for reciprocation in said casing, a calibration screw movable in said one portion of said axial bore and operably engageable with said stem, a spring disposed in engagement with said other wall and urging said stem into engagement with said screw, and temperature adjusting means including a shaft member secured to said adjusting member, said shaft member being of a preselected length and thereby being adapted to support a temperature selecting handle in a predetermined position spaced from said casing wall, said shaft member having a C-shaped cross-sectional configuration to permit access to said calibration screw.

3. In a thermostatic control device, the combination of a casing having a portion providing a threaded bore in one wall thereof and having another wall spaced from said one wall, an adjusting member having an external threaded portion cooperable with said bore, said member having an axial bore one portion of which is threaded, said adjusting member having a shaft attaching means, temperature responsive means disposed between said walls and including a stem mounted for reciprocation in said casing, a calibration screw movable in said one portion of said axial bore and operably engageable with said stem, a spring carried by said casing and urging said stem into engagement with said screw, and temperature adjusting means including a shaft member secured to said shaft attaching means of said adjusting member, said shaft member being of a preselected length and thereby being adapted to support a temperature selecting handle in a predetermined position spaced from said casing wall, said shaft member having a C-shaped cross-sectional configuration to permit access to said calibration screw.

References Cited by the Examiner
UNITED STATES PATENTS

| | | | |
|---|---|---|---|
| 2,441,192 | 5/48 | Graves | 200—140 |
| 2,465,830 | 3/49 | Anderson | 200—140 |
| 2,607,533 | 8/52 | Main | 236—99 |
| 2,768,263 | 10/56 | Callihan | 200—138 |
| 2,807,690 | 9/57 | Schwaneke | 200—138 |
| 2,855,486 | 10/58 | Weber et al. | 200—140 |

BERNARD A. GILHEANY, *Primary Examiner.*